(12) United States Patent
Chavez et al.

(10) Patent No.: US 11,741,677 B1
(45) Date of Patent: Aug. 29, 2023

(54) SYSTEMS AND METHODS FOR EMPLOYING AUGMENTED REALITY IN APPRAISAL AND ASSESSMENT OPERATIONS

(71) Applicant: United Services Automobile Association (USAA), San Antonio, TX (US)

(72) Inventors: Carlos J P Chavez, San Antonio, TX (US); Donna Moncrief Brown, San Antonio, TX (US); David James, San Antonio, TX (US); Andrea Richardson, San Antonio, TX (US); Victoria A. Santos, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/687,196

(22) Filed: Mar. 4, 2022

Related U.S. Application Data

(63) Continuation of application No. 17/172,036, filed on Feb. 9, 2021, now Pat. No. 11,282,286, which is a continuation of application No. 16/702,229, filed on Dec. 3, 2019, now Pat. No. 10,943,406, which is a continuation of application No. 15/969,518, filed on May 2, 2018, now Pat. No. 10,515,486.

(60) Provisional application No. 62/500,949, filed on May 3, 2017.

(51) Int. Cl.
*G06T 19/00* (2011.01)
*G06Q 40/08* (2012.01)

(52) U.S. Cl.
CPC .......... *G06T 19/006* (2013.01); *G06Q 40/08* (2013.01)

(58) Field of Classification Search
None
See application file for complete search history.

(56) References Cited

U.S. PATENT DOCUMENTS

| 10,970,990 B1 | 4/2021 | Jacob |
| 2015/0106006 A1 | 4/2015 | Najafi |
| 2016/0133230 A1 | 5/2016 | Daniels et al. |
| 2017/0039307 A1 | 2/2017 | Koger et al. |

(Continued)

*Primary Examiner* — David H Chu
(74) *Attorney, Agent, or Firm* — Fletcher Yoder, P.C.

(57) ABSTRACT

An augmented reality structural assessment system may include a display device, at least one sensor configured to generate image data from a structure, and a processor. The processor may receive the image data that represents one or more portions of the structure and receive motion data representative of a number of steps traversed by a user about the structure. The processor may generate a visualization of a scenario related to structural damage to the one or more portions of the structure of the image data. The visualization may be presented to a user via the display device, such that the visualization augments a view of the structure via the display device to include the one or more dimensions. The processor may then receive input data regarding one or more assessments of damage to the structure corresponding to the scenario, the image data, and the one or more dimensions, and store the data regarding one or more assessments of damage in a storage component. The processor may then generate a policy quote based in part on the one or more assessments.

20 Claims, 3 Drawing Sheets

(56) References Cited

U.S. PATENT DOCUMENTS

| | | |
|---|---|---|
| 2017/0040004 A1 | 2/2017 | He |
| 2017/0236331 A1 | 8/2017 | Bryson et al. |
| 2017/0322119 A1* | 11/2017 | Da Silva ............ G06K 7/10386 |
| 2018/0159838 A1* | 6/2018 | Dintenfass ................ G06F 3/14 |
| 2019/0051054 A1 | 2/2019 | Jovanovic et al. |
| 2021/0374875 A1* | 12/2021 | Davis ..................... G06Q 40/08 |

* cited by examiner

SYSTEMS AND METHODS FOR EMPLOYING AUGMENTED REALITY IN APPRAISAL AND ASSESSMENT OPERATIONS

CROSS-REFERENCE TO RELATED APPLICATION

This application is a continuation of U.S. patent application Ser. No. 17/172,036, now U.S. Pat. No. 11,282,286, entitled, "SYSTEMS AND METHODS FOR EMPLOYING AUGMENTED REALITY IN APPRAISAL OPERATIONS," filed Feb. 9, 2021, which is a continuation of U.S. patent application Ser. No. 16/702,229, now U.S. Pat. No. 10,943,406, entitled, "SYSTEMS AND METHODS FOR EMPLOYING AUGMENTED REALITY IN APPRAISAL OPERATIONS," filed Dec. 3, 2019, which is a continuation of U.S. patent application Ser. No. 15/969,518, now U.S. Pat. No. 10,515,486, entitled, "SYSTEMS AND METHODS FOR EMPLOYING AUGMENTED REALITY IN APPRAISAL OPERATIONS," filed May 2, 2018, which claims priority to and the benefit of U.S. Provisional Application No. 62/500,949, entitled "SYSTEMS AND METHODS FOR EMPLOYING AUGMENTED REALITY IN APPRAISAL OPERATIONS," filed May 3, 2017, which are each hereby incorporated by reference in their entirety for all purposes.

BACKGROUND

The present disclosure relates generally to using augmented reality to assist in various appraisal and assessment operations. More specifically, the present disclosure relates to adjusting visualizations depicted via an electronic display to assist in appraisal and adjustment operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Claims adjusters and appraisers may encounter a variety of types of damages when visiting properties. To assist claims adjusters and appraisers in effectively identifying damage at a property and assessing a value for the damage, supervisors may provide feedback to the claims adjusters and appraisers after the adjuster or appraiser provides a report indicative of the adjuster's or appraiser's assessment. To better prepare the adjusters and appraisers to perform their job tasks, it may be desirable to train these individuals before performing adjustment and appraisal services on actual property damage.

BRIEF DESCRIPTION

In one embodiment, an augmented reality structural assessment system may include a display device, at least one sensor configured to generate image data from a structure, and a processor. The processor may receive the image data that represents one or more portions of the structure and receive motion data representative of a number of steps traversed by a user about the structure. The processor may generate a visualization of a scenario related to structural damage to the one or more portions of the structure of the image data. The visualization may be presented to a user via the display device, such that the visualization augments a view of the structure via the display device to include the one or more dimensions. The processor may then receive input data regarding one or more assessments of damage to the structure corresponding to the scenario, the image data, and the one or more dimensions, and store the data regarding one or more assessments of damage in a storage component. The processor may then generate a policy quote based in part on the one or more assessments.

In another embodiment, a method may include receiving, via a processor, one or more scenarios related to damage to a structure based on image data associated with one or more portions of the structure. The method may include receiving, via the processor, motion data representative of a number of steps traversed by a user about the structure and determining, via the processor, a floorplan associated with the structure based on the motion data. The method may include generating, via the processor, a set of visualizations based on the one or more scenarios and the floorplan and presenting, via the processor, the set of visualizations on a display device, where the set of visualizations is configured to be overlaid on the image data representing the one or more portions of the structure. The image data corresponds to a real-time view of the one or more portions of the structure, and the set of visualizations is related to structural damage on the one or more portions of the structure. The method may include receiving, via the processor, data comprising one or more assessments of damage corresponding to the one or more portions of the structure and the structural damage, and storing, via the processor, the data in a storage component.

In yet another embodiment, a non-transitory computer-readable medium may include computer-executable instructions that cause a processor to receive image data associated with one or more portions of a structure via an image sensor, generate a set of visualizations based on a scenario related to damage to the one or more portions of the structure, present the set of visualizations on a display device, wherein the set of visualizations comprises an augmented view of the structure with the damage, receive data comprising one or more assessments of damage corresponding to the one or more portions of the structure and the damage, and determine a repair cost of the damage based on the one or more assessments.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
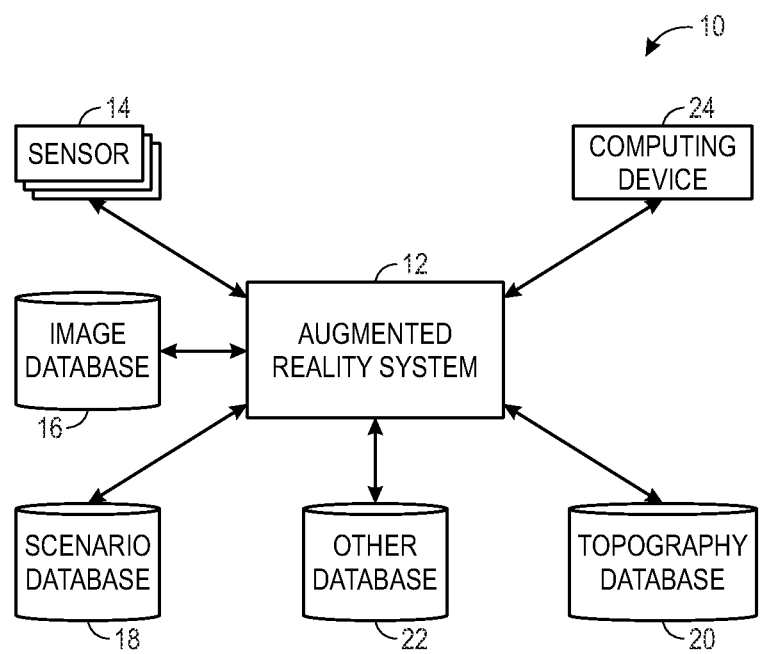
FIG. 1 illustrates a block diagram of an assessment system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Training operations for claims adjusters and appraisers may typically involve reviewing documentation and mock-ups created in a classroom setting to inform adjusters and appraisers of how to assess certain situations. As can be appreciated, the fixed nature of the documentation and mockups limits the experience that the training appraiser may have when learning how to appraise a property. That is, appraisal operations may include evaluating different types of properties to determine the current value of the properties. In the same manner, adjusters may determine an amount of value lost or a cost for replacement of a property that suffered damage caused by a variety of sources (e.g., wind, hail, flood). Although documentation and images may assist appraisers and adjusters in learning what each type of property or property damage may look like, it may be difficult to apply the knowledge gained from evaluating certain images to assessing a structure that does not look like the image used for training.

With the foregoing in mind, in some embodiments, an augmented reality system may retrieve data from various databases and overlay visualizations on real images, as viewed by a user, via a transparent electronic display. That is, when performing certain training scenarios, the augmented reality system may overlay damage visualizations to various objects, appliances, fixtures, and the like in a structure (e.g., building) to train the user in appraising or assessing (e.g., for adjustment purposes) damage to various objects. For instance, when performing a training exercise, the augmented reality system may project fire damage to a wall to determine how the appraiser or adjuster may assess the projected damage.

In some embodiments, the augmented reality system may provide a checklist visualization to assist the appraiser, adjuster, or any individual in acquiring images related to acquiring an appraisal. The checklist visualization may point to or outline various objects detected as potential hazards.

In addition to overlaying visualizations that simulate damage, the augmented reality system may include object recognition technology to detect various objects, materials, and the like to better assess a value for the structure. For example, the augmented reality system may detect dimensions and size of the structure using sensors (e.g., infrared sensors), may identify various types of appliances present within the structure, types of material (e.g., wood, metal) used for various components of the structure, and the like. In some embodiments, the augmented reality system may identify objects that may pose an extra risk for damage such as a pile of wood, dry bushes next to the structure, or the like.

In addition, the augmented reality system may retrieve global positioning system (GPS) data regarding the structure being assessed based on sensor data acquired via the augmented reality system. The GPS data may be used to visually depict property lines, flood plains, and other relevant information regarding the property being assessed via the augmented reality system. Further, the augmented reality system may determine the topography of the land in which the structure is disposed and simulate various types of disruptive events based on the topography information. For instance, the augmented reality system may simulate a flood or fire upon the structure based on the topography data, empirical data regarding previous floods in the area, empirical data regarding wind patterns in the area, empirical data regarding fire damage in the area, empirical data regarding fire response times in the area, and the like. By simulating the disruptive event, the appraiser or adjuster may better assess the amount of damage that the structure may endure during the disruptive event and may better provide a policy recommendation to cover damages for these types of disruptive events.

By way of introduction, FIG. 1 illustrates a block diagram of an assessment system 10 that may include an augmented reality system 12 that may receive data from various sources, generate visualizations over a transparent display based on the data, and generate reports regarding the assessments of the visualizations. The augmented reality system 12 may be a computing system that includes sensors and a transparent display that enables visualizations to be depicted on the display. As such, the visualizations may be viewed along with real objects visible to a user. The augmented reality system 12 may thus use any suitable electronic display device that enables visualizations to be presented (e.g., projected) on a transparent medium. Additional details regarding the augmented reality system 12 will be discussed below with reference to FIG. 2.

In some embodiments, the augmented reality system 12 may be used to assist individuals in training to assess, adjust, or appraise simulated or actual damage incurred on a structure or object. That is, insurance adjusters may assess damage that occurs to a structure or objects within the structure to assess the amount of damage and the cost of the damage. Based on the assessment, insurance claims may be determined. In addition, when evaluating a structure for insurance coverage, the augmented reality system 12 may simulate certain disruptive events (e.g., floods) to determine which parts of the structure may incur damage, which objects within the structure may incur damage, and the like. In any case, the augmented reality system 12 may assist appraisers and adjusters in performing their respective tasks in appraising a value of property and determining damage costs or replacement costs due to unforeseen damage.

With the foregoing in mind, the augmented reality system 12 may receive data regarding the structure and information related to the structure from one or more sensors 14. The sensors 14 may be disposed on the augmented reality system 12 or may be disposed in various locations and yet communicatively accessible to the augmented reality system 12. The sensors 14 may include any type of device capable of detecting location, moisture, temperature, light, and the like. One or more sensors 14 may be disposed on different types of property such as a home, a vehicle, and the like. In certain embodiments, one or more sensors 14 may be disposed within certain rooms of the home, outside the home, within the vehicle, or outside the vehicle. The sensors 14 may also be disposed on devices carried by or worn by individuals. For example, the sensors 14 may be disposed on mobile phones, wearable electronics, and the like. In one embodiment, the sensors 14 may provide location information regarding the sensors 14. As such, the sensors 14 may provide global positioning system (GPS) coordinates and the like to indicate a location of the sensors 14.

In addition, the sensors 14 may include infrared sensors, acoustic sensors, vibration sensors, and the like. In one embodiment, the sensors 14 may be employed to determine dimensions of objects (e.g., doors, rooms). The determined dimensions may then be stored in a database, storage device, memory, report, or the like. The stored information may be used to assess an insurance policy or coverage that may suit the size of the structure being insured.

The sensors 14 may also include image sensors that acquire image data of the user of the augmented reality system 12, the structure being assessed by the user, and the like. In some embodiments, the image sensor may be part of the augmented reality system 12, such that the augmented reality system 12 may present a visualization representing a view that is in the presence of the user in real time or near-real time (e.g., near instantaneous, within seconds, within milliseconds).

In addition to sensor data, the augmented reality system 12 may have access to various databases that include information regarding the structure being evaluated, the objects or materials of the structure, various disruptive event scenarios that could occur to the structure, topography data regarding the structure and the like. For instance, image database 16 may include a number of images of various types of objects and components that may be part of a structure (e.g., building, home) or within the structure.

The image database 16 may thus include a collection of images related to features of a structure such as stairs, siding, floor composition (e.g., hardwood, carpet), and the like. The augmented reality system 12 may receive image data related to the objects that are present in its view and compare the image data to the images of the image database 16 to identify the items in view of the augmented reality system 12.

In addition to features of the structure, the image database 16 may include images of furniture, appliances, equipment (e.g., air conditioning), and other objects that may be disposed within the structure. After receiving the image data regarding the items disposed within a structure, the augmented reality system 12 may compare the items to the images of the image database 16 to identify the types of items that are present in the structure. The augmented reality system 12 may generate a list of the identified items in a list that may be used to assess an insurance appraisal or value of the structure and the items within the structure.

In some embodiments, the augmented reality system 12 may receive data from a scenario database 18 that includes various types of damage scenarios that an appraiser or adjuster may use for training. That is, the scenario database 18 may include a collection of images and graphics that may be projected onto the electronic display of the augmented reality system 12 and over real objects in view of the user of the augmented reality system 12. For example, the scenario database 18 may include data related to a wall damaged by fire. In this case, the augmented reality system 12 may receive the image data related to the wall damage from the scenario database 18 and project the image data over a wall within the structure when the augmented reality system 12 views the respective wall.

The augmented reality system 12 may be programmed to produce a variety of scenarios that provide a variety of types of damage (e.g., flood, fire, wind, hail) to different parts of the structure to assist in training the appraiser in identifying the damage and assessing the value of the damage. By projecting different types of damage visualizations onto portions of a structure, the augmented reality system 12 may provide a more flexible training module that can be altered between training exercises. The dynamic nature of projecting different types of damage visualizations may better equip an appraiser to identify damages in real appraisal situations.

The augmented reality system 12 may also have access to a topography database 20 that may include data related to the land in which the structure is disposed. The topography data may include information related to the physical features (e.g., slope, incline, position above or below sea-level) regarding the land upon which the structure is disposed. The topographic data may assist the augmented reality system 12 in generating visualizations to project on the display to simulate the effects of different types of disruptive events occurring to the structure. For example, if the topographic data regarding the structure indicates that the structure is located within a flood plain, the augmented reality system 12 may simulate a flood within the structure and present visualizations on the display to indicate a water level within the structure. The simulated water level visible with the real items within the structure may assist the appraiser in determining which items to include in a flood insurance policy.

In addition to the databases described above, it should be noted that the augmented reality system 12 may have access to other databases 22 that may provide additional information related to the structure, environmental conditions associated with the structure, and the like. For instance, the other databases 22 may include property information indicating the property lines for the property in which the structure is disposed. In some embodiments, the augmented reality system 12 may project property lines on its display to indicate where the property ends and thus evaluate any objects (e.g., trees) that may be considered in an appraisal based on the proximity to the property line. In addition, the augmented reality system 12 may present information related to where easements may be located and the like. The environmental conditions associated with the structure may include empirical wind data for the area, empirical hail data for the area, empirical flood data for the area, and the like. The empirical data for each of these types of disruptive events may include information detailing the occurrence of these events over a period of time. As such, the augmented reality system 12 may assess a likelihood or probability of occurrence during a term of an insurance policy or the like.

In some embodiments, as an individual works to assess or appraise a structure, the augmented reality system 12 may be communicatively coupled to a computing device 24 associated with a supervisor or the like via a network. The augmented reality system 12 and the computing device 24 may include any suitable computing device, such as a general-purpose computer, a mobile computing device, a laptop-computing device, a tablet computing device, a wearable computing device, and the like.

In some embodiments, the computing device 24 may receive image data from sensors 14 disposed on the augmented reality system 12, such that the image data depicts the objects in view of the augmented reality system 12. As such, the computing device 24 may view the same items as viewed by the user of the augmented reality system 12. As the user of the augmented reality system 12 views different parts of the structure, he may seek input from a supervisor or other individual via the computing device 24. That is, the supervisor may view the image data, as provided by the augmented reality system 12, via a display of the computing device 24. The supervisor may add visualizations, such as mark ups, highlights, or the like, to the image data and transmit the added visualizations to the augmented reality system 12. In addition, the supervisor may communicate with the user of the augmented reality system 12 via audio inputs of the computing device 24. The user of the augmented reality system 12 may receive the audio based information from the supervisor via audio outputs disposed on the augmented reality system 12, via transcribed text messages depicted on the display of the augmented reality system 12, or the like.

In addition to data received from a supervisor, the augmented reality system 12 may receive updates or notifications with regard to changes in management, in process procedures, and additional data from the computing device 24 or the like. In certain embodiments, as updates or changes are stored in the other database 22, the computing device 24, or in another data source, the computing device 24 or another suitable computing device may detect the change and send or push a notification regarding the change to the augmented reality system 12 in real time or near-real time, such that the notification is received by the augmented reality system 12 within seconds.

It should be noted that as the user of the augmented reality system 12 assess a structure or performs a training session related to a structure, data regarding the assessment performed by the user may be input to the augmented reality system 12 via various input devices. The input devices may include a keyboard, a microphone, or the like. After the information regarding an assessment is collected, the augmented reality system 12 may store the relevant information in a suitable memory, storage component or device, database, or the like.

Figure 2:
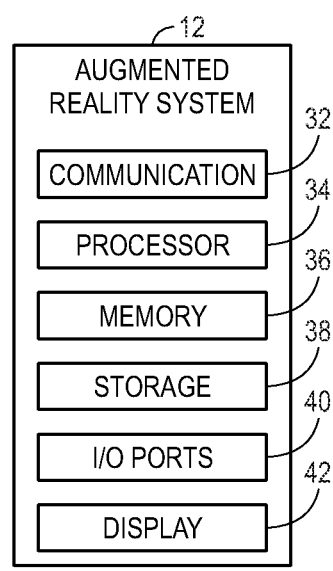
FIG. 2 illustrates a block diagram of an augmented reality system employed by the appraisal system of FIG. 1, in accordance with embodiments described herein.

To perform some of the actions set forth above, the augmented reality system 12 may include certain components to facilitate these actions. FIG. 2 is a block diagram of example components within the augmented reality system 12. For example, the augmented reality system 12 may include a communication component 32, a processor 34, a memory 36, a storage 38, input/output (I/O) ports 40, a display 42, and the like. The communication component 32 may be a wireless or wired communication component that may facilitate communication between the augmented reality system 12, the sensors 14, the databases 16, 18, 20, 22, and the computing device 24. Additionally, the communication component 32 may facilitate data transfer to the augmented reality system 12 such that the augmented reality system 12 may receive visualizations to be projected onto its display 42.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store the data, analysis of acquired images, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse, microphone), sensors, input/output (I/O) modules, and the like. The display 42 may operate to depict visualizations associated with software or executable code being processed by the processor 34. In one embodiment, the display 42 may be a touch display capable of receiving inputs from a user of the augmented reality system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the monitoring system 12. The display 42 may be transparent in that a user of the display 42 may look through the display 42 to see objects present in front of the user. In addition, the display 42 may be capable of projecting visualizations over the real objects viewable through the display 42.

It should be noted that the components described above with regard to the augmented reality system 12 are exemplary components and the augmented reality system 12 may include additional or fewer components as shown. Additionally, it should be noted that the computing device 24 may also include similar components as described as part of the augmented reality system 12.

Figure 3:
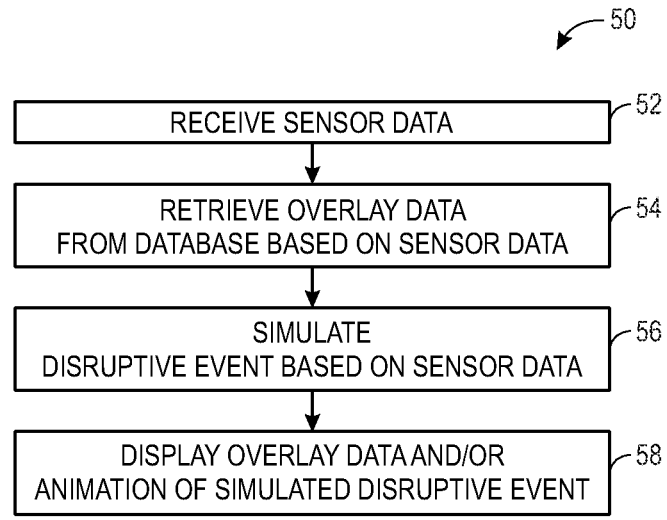
FIG. 3 illustrates a flow chart of a method for overlaying data and/or visualizations on real objects via the augmented reality system, in accordance with embodiments described herein.

With the foregoing in mind, FIG. 3 illustrates a flow chart of a method 50 employed by the augmented reality system 12 for presenting visualizations via the display 42 of the augmented reality system 12. Although the following description of the method 50 is described in a particular order, it should be noted that the method 50 is not limited to the depicted order; and, instead, the method 50 may be performed in any suitable order, including omitting certain blocks.

Referring now to FIG. 3, at block 52, the augmented reality system 12 may receive sensor data via the sensors 14. As discussed above, the sensor data may include image data as viewed by the augmented reality system 12. As such, the image data may be acquired via an image sensor disposed on the augmented reality system 12. In addition, the sensor data may include location information and other types of data related to a structure in view of the augmented reality system 12.

At block 54, the augmented reality system 12 may retrieve overlay data or visualizations to project on the display 42 based on the data received at block 54. In certain embodiments, the augmented reality system 12 may be operating in a training session mode that presents various scenarios for an appraiser or adjuster to assess when performing a training exercise. As such, the augmented reality system 12 may be provided with information related to certain scenarios to train the appraiser or adjuster. Based on the information, the augmented reality system 12 may retrieve image data to project over various portions of the structure viewable by the augmented reality system 12. The image data may be retrieved via the scenario database 18 or the like.

By providing visualizations via the augmented reality system 12, the appraiser or adjuster may no longer use physical mockup structures that provide fixed damage to assess. Instead, the augmented reality system 12 may dynamically alter the types of damage projected (e.g., presented via the display 42) on the structure based on inputs provided to the augmented reality system 12. Moreover, the augmented reality system 12 may present the visualizations on any structure, thereby providing a variety of environments in which to conduct a training session.

In addition, the augmented reality system 12 may retrieve overlay data based on information acquired via the topography database 20 or other databases 22. For instance, the topography database 20 may provide visualizations to depict the land surrounding the structure, where flood plains may lie, and the like. The other databases 22 may provide property information indicating where the property in which the structure lies begins and ends.

In some embodiments, the other databases 22 may include information regarding the locations of certain utility devices such as gas lines, electric utilities, sprinkler systems, electric fence lines, and the like. These items may be visualized via the augmented reality system 12 for view by the appraiser or adjuster.

At block 56, the augmented reality system 12 may simulate a disruptive event scenario within the structure being appraised or evaluated. That is, the augmented reality system 12 may receive an input indicating a type of disruptive event to simulate. Based on the topographical information and empirical data regarding the disruptive event, the augmented reality system 12 may generate visualizations to project on the display 42 to portray the types of damage that the structure may incur in these types of events. For instance, when simulating a flood, the augmented reality system 12 may determine a water level associated with the flood and generate a visualization of a water line within the structure. The appraiser or adjuster may use the water line to assess what items may need insurance coverage in an associated flood insurance policy. In another example, a wild fire may be simulated based on a likely starting point of a fire and an expected response time of a fire department, the damage that may be incurred by a fire may be visualized and projected via the display 42 onto different portions of the structure. The visualizations of the expected fire damage may assist the appraiser or adjuster in determining a fire insurance policy.

A disruptive event may also include malfunctioning equipment such as a water heater, air conditioning unit, pipe, or the like. As such, the augmented reality system 12 may generate simulated visualizations that depict the effects of a leak from the malfunctioning equipment through the structure to assess likely damage associated with the structure. As such, the simulated visualizations may depict imagery of a leak or flood in the structure.

After retrieving the overlay data or simulating the disruptive event, the augmented reality system 12 may proceed to block 58 and display or project the visualizations via the display 42. Based on the simulation visualizations, the augmented reality system 12 may determine whether changes to the lay of the land or elevation in which the structure is positioned may be adjusted to minimize the risk of damage. For example, if a simulated flood produces a certain amount of damage, the augmented reality system 12 may recommend adding a drainage system to the home or grading the land around the home to improve drainage, and thus reduce the risk of flood damage. As a result, the augmented reality system 12 may present the visualization such that it augments a view of a structure or object in the presence of the augmented reality system 12 via the display 42.

In addition to providing training scenarios, the augmented reality system 12 may determine information related to the structure being appraised or evaluated. For instance, FIG. 4 illustrates a flow diagram of a method 70 for collecting information regarding a structure via the augmented reality system 12.

Figure 4:
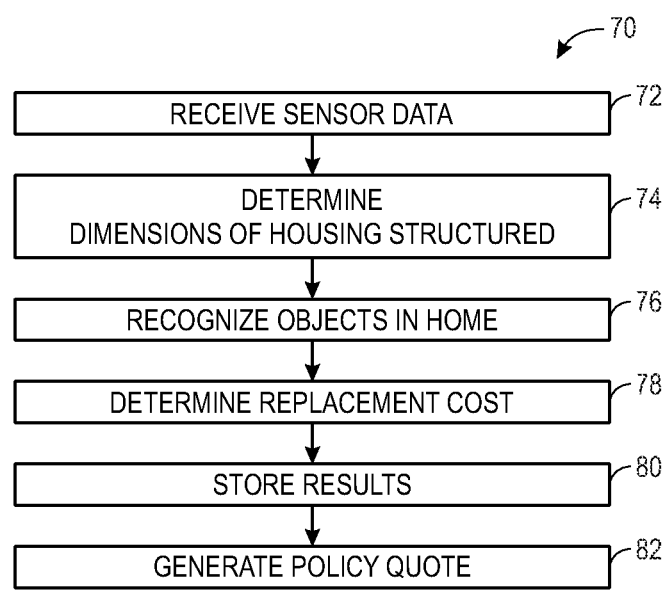
FIG. 4 illustrates a flow chart of a method for retrieving data regarding real objects via the augmented reality system, in accordance with embodiments described herein.

Referring now to FIG. 4, at block 72, the augmented reality system 12 may receive data from sensors 14 disposed on the augmented reality system 12. The sensors 14 may include infrared sensors, image data sensors, acoustic sensors, dimensional sensors (e.g., acquire dimension data), motion sensors, and the like.

At block 74, the augmented reality system 12 may determine dimensions of various properties (e.g., rooms, doors, stairway) regarding the structure. The dimensions may be used to assess a property value of the structure and a property value of various objects. As data is acquired regarding the dimensions of the house, the augmented reality system 12 may generate a three-dimensional model of the structure for analysis and storage.

In addition, at block 76, the augmented reality system 12 may perform object recognition on various items captured by the image sensor. The object recognition process may include comparing image data acquired via the augmented reality system 12 with images stored in the image database 16. The object recognition may be used to detect the types of material (e.g., wood, metal) used on various portions (e.g., roof) of the structure. The type of material used to build the structure may provide insight into the costs associated with replacing or repairing the structure. The object recognition process may also include identifying potential hazards such as a collection of wood, chemicals located near open flames, dry bushes close to the structure, trees close to the structure, and the like.

The object recognition process may include identifying where studs are located within the home. Based on the stud locations, the augmented reality system 12 may determine which studs or walls are load bearing structures. The load bearing structures may be closely evaluated with respect to any simulated events to assess likelihood of damage.

The object recognition process may also assess a condition of the objects. For example, if a water heater shows signs of rust as compared to a corresponding image available via the image database 16, the augmented reality system 12 may determine that the water heater should be replaced, provide a diminished value for the water heater, or assess potential damage in the event of failure of the water heater.

Based on the data received and determined at blocks 72, 74, and 76, the augmented reality system 12 may determine a replacement cost for each of the objects detected and the dimensions of the structure. At block 80, the augmented reality system 12 may store the results of the replacement cost in a storage device or database. At block 82, the augmented reality system 12 may generate an insurance policy quote or recommendations for different types of insurance policies to cover the objects detected and the scenarios presented in the method 50.

When performing the method 70, in some embodiments, the augmented reality system 12 may detect gestures and/or motions by a user in view of an image sensor in the augmented reality system 12 and generate a visualization to be depicted on the display 42. The gestures or motions of a user may be tracked by the augmented reality system 12 and used to generate a floorplan or sketches that may be useful for appraisal and/or adjustment operations. By way of example, the augmented reality system 12 may track a user's hand or some other component (e.g., laser pointer) as it traverses across an edge of a room. Based on the tracked movement, the augmented reality system 12 may capture a floorplan shape or dimensions of a respective room or area. In certain embodiments, the tracked movement may be correlated to a distance based on a number of steps detected as being taken, the speed in which the tracked movement is moving, changes in positions of objects in the acquired image data as the movement is being tracked, and the like.

In addition to generating floorplan data or sketches, the gestures may be used to add virtual symbols or objects onto the image data presented in the augmented reality. That is, gestures may be used to draw virtual arrows, circles, and other objects over the image data that represents the real objects presented in image data acquired by image sensors. The virtual objects may be useful to emphasize or highlight certain features of a room. In addition, notes or comments may be incorporated into the image data to provide context for the appraiser or adjuster, thereby assisting the appraiser or adjuster to recollect thoughts concerning the property or a particular item or aspect of the property.

In certain embodiments, the gestures may be used to enter data into virtual forms or plans that are overlaid on the image data presented by the augmented reality system 12. In addition to virtual forms, the augmented reality system 12 may receive other image data (e.g., pictures) that may be overlaid on the actual image data representative of the real property to assist in identifying damage or changes to the property. For example, an image of a room in a house may be overlaid with image data representative of the same room in the same house with a similar view to identify changes or damage that occurred in the room.

Figure 5:
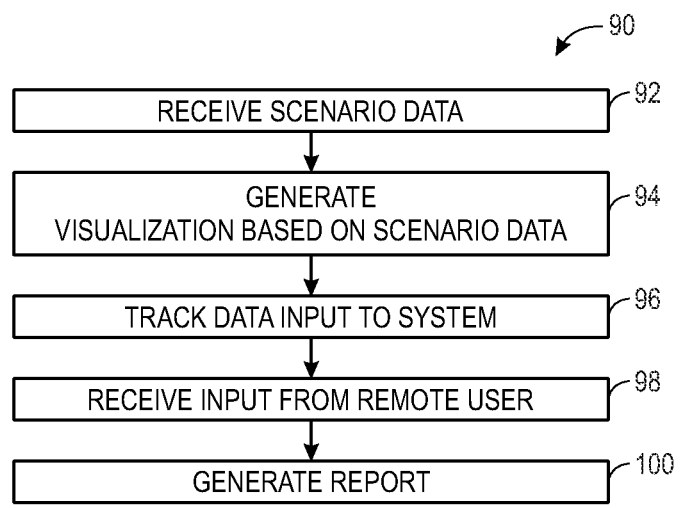
FIG. 5 illustrates a flow chart of a method for performing appraisal training operations using the augmented reality system, in accordance with embodiments described herein.

When conducting a training session, the augmented reality system 12 may also track how the appraiser or adjuster performs his assessment based on the method 90 of FIG. 5. Referring now to FIG. 5, at block 92, the augmented reality system 12 may receive scenario data that may indicate a type of training scenario to create for the appraiser or adjuster. The scenario data may include a list of types of damage to portray, simulations of certain disruptive events, and the like.

At block 94, the augmented reality system 12 may generate visualizations based on the scenario data. As such, the augmented reality system 12 may produce visualizations to overlay real objects within view of the augmented reality system 12 via the display 42.

In addition to projecting visualizations via the display 42, at block 96, the augmented reality system 12 may receive data regarding an assessment of the projected visualization. That is, the appraiser or adjuster may provide input data regarding the type of damage of the visualization, an expected cost to repair or replace the object associated with the visualization, and the like.

In some embodiments, at block 98, the augmented reality system 12 may receive input or commentary from a remote user via the computing device 24. That is, a supervisor or more experienced appraisers/adjusters may assist the appraiser or adjuster in assessing the visualized damage. It should be noted that in some embodiments, the input or commentary may be received via the remote user during an actual appraisal, as opposed to a training session. The computing device 24 may receive image data from image sensors disposed on the augmented reality system 12 or surrounding the augmented reality system 12 and present the image data on the display 42 of the computing device 24. The remote user may then add visualizations that may be received by the augmented reality system 12 via the computing device 24. The augmented reality system 12 may produce the visualizations created by the remote user for view via the display 42. The interactive assistance of the remote user may assist the appraiser or adjuster in conducting an actual appraisal/evaluation or a training appraisal/evaluation session.

At block 100, the augmented reality system 12 may generate a report including the data input by the appraiser or adjuster. The data may be used to evaluate the appraiser's or adjuster's assessment of the virtual damage and to evaluate the quality of the visualizations used to depict various scenarios.

In addition to performing assessment and training operations as described above, the augmented reality system 12 may be employed in assessing actual damage to property for insurance adjusters. With this in mind, each of the methods described above may also be employed in situations for assessing actual damage to property. In certain embodiments, after performing the appraisal or adjustment operations, the appraiser or adjuster may use the augmented reality system 12 to issue a payment or initiate a fund transfer for the calculated amount to the property owner. That is, the augmented reality system 12 may be employed to perform actual appraisal and adjustment operations, in addition to training operations. When performing actual appraisal and adjustment operations, the augmented reality system 12 may determine a property owner associated with a property being evaluated based on data provided to the augmented reality system 12, location data (e.g., GPS coordinate) of the augmented reality system 12, data available in databases 22, and the like. After assessing the damage and determining the cost for replacement or repair of the damaged property using the augmented reality system 12, the augmented reality system 12 may present a report containing the assessed or appraised damage amounts that is owed to the property owner. In one embodiment, the augmented reality system 12 may receive an input requesting that funds be transferred to a bank account associated with the property owner. The augmented reality system 12 may then send a request to a server system or computing device associated with the organization that is to pay the property owner to initiate the transfer of funds to the account of the property owner based on the amount indicated in the report. In some embodiments, the augmented reality system 12 may identify the account associated with the property owner based on data received regarding the property owner. In any case, by providing the user of the augmented reality system 12 the ability to issue payments to the property owner, the augmented reality system 12 may expedite the payment process and eliminate the inefficiencies in waiting for a separate entity or user to initiate a transfer of funds that has already been analyzed and determined to be accurate by an appraiser and/or adjuster.

In addition to providing the ability to train appraisers and adjusters, to issue payments, and the like, the augmented reality system 12 may also be employed to communicate scheduled appointments and assignments to the respective user of the augmented reality system 12. That is, the user of the augmented reality system 12 may be tasked with performing appraisal or adjustment operations for a certain set of properties. In some embodiments, as new assignments are received by the augmented reality system 12, the augmented reality system 12 may generate a visual indication of the newly assigned property for which the user is tasked to perform appraisal or adjuster operations. In one embodiment, the augmented reality system 12 may receive a list of properties that are assigned to the user and determine an order in which the user should visit each property based on a current location of the augmented reality system 12 and the respective location of each listed property. The current location of the augmented reality system 12 may be acquired via the sensors 14 described above or via input by the user. The order of the properties may be determined based on routes available to each respective location, expected duration of time for each appraisal operation for the respective property, expected traffic conditions during the expected travel time to a respective property, and the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An augmented reality structural assessment system, comprising:
   a display device;
   at least one sensor configured to acquire image data associated with a structure;
   a processor configured to:
   receive the image data, wherein the image data represents one or more portions of the structure;
   generate a visualization of a scenario related to structural damage to the one or more portions of the structure of the image data;
   present the visualization to a user via the display device such that the visualization is configured to augment a view of the structure presented via the display device to include the structural damage;
   track position data associated with a light produced by a device as it traverses about one or more representations of the one or more portions of the structure presented in the image data;
   determine one or more dimensions of one or more portions of the structure based on the position data;
   receive data comprising one or more assessments of damage corresponding to the scenario and the one or more dimensions; and
   generate a policy quote based in part on the one or more assessments.

2. The system of claim 1, wherein the processor is configured to:
   generate a plurality of visualizations representative of one or more property lines associated with the structure; and
   present the plurality of visualizations with the visualization via the display device.

3. The system of claim 1, wherein the processor is configured to:
   generate a plurality of visualizations representative of one or more floor plans associated with the structure based on the one or more dimensions; and
   present the plurality of visualizations with the visualization via the display device.

4. The system of claim 1, wherein the processor is configured to:
   detect one or more gestures via the image data; and
   add one or more virtual objects to the image data based on the one or more gestures.

5. The system of claim 4, wherein the one or more virtual objects comprise one or more shapes.

6. The system of claim 5, wherein the one or more shapes comprise one or more arrows, one or more circles, or both.

7. The system of claim 1, wherein the one or more assessments comprise one or more comments incorporated into the image data.

8. The system of claim 1, comprising one or more dimensional sensors configured to acquire additional data regarding the one or more dimensions of the structure.

9. The system of claim 1, comprising one or more motion sensors configured to capture additional data indicative of one or more gestures of the user.

10. The system of claim 1, wherein the processor is configured to:
    detect one or more gestures via the image data; and
    add data into one or more virtual forms based on the one or more gestures.

11. A method, comprising:
    receiving, via a processor, image data representative of one or more portions of a structure via one or more image sensors;
    generating, via the processor, a visualization of a scenario related to structural damage to the one or more portions of the structure of the image data;
    presenting, via the processor, the visualization to a user via a display device such that the visualization is configured to augment a view of the structure presented via the display device to include the structural damage;
    tracking, via the processor, a position data associated with a light produced by a device as it traverses about one or more representations of the one or more portions of the structure presented in the image data;
    determining, via the processor, one or more dimensions of one or more portions of the structure based on the position data;
    receiving, via the processor, data comprising one or more assessments of damage corresponding to the scenario and the one or more dimensions; and
    generating, via the processor, a policy quote based in part on the one or more assessments.

12. The method of claim 11, comprising:
    generating a plurality of visualizations representative of one or more property lines associated with the structure; and
    presenting the plurality of visualizations with the visualization via the display device.

13. The method of claim 11, comprising:
    generating, via the processor, a plurality of visualizations representative of one or more floor plans associated with the structure based on the one or more dimensions; and
    presenting the plurality of visualizations with the visualization via the display device.

14. The method of claim 11, comprising:
    detecting one or more gestures via the image data; and
    adding one or more virtual objects to the image data based on the one or more gestures.

15. The method of claim 14, wherein the one or more virtual objects comprise one or more shapes.

16. The method of claim 15, wherein the one or more shapes comprise one or more arrows, one or more circles, or both.

17. The method of claim 11, wherein the one or more assessments comprise one or more comments incorporated into the image data.

18. A non-transitory computer-readable medium comprising computer-executable instructions that, when executed by a processor, is configured to cause the processor to:

receive image data acquired by at least one sensor, wherein the image data represents one or more portions of a structure;

generate a visualization of a scenario related to structural damage to the one or more portions of the structure of the image data;

present the visualization to a user via a display device such that the visualization is configured to augment a view of the structure presented via the display device to include the structural damage;

track position data associated with a light produced by a device as it traverses about one or more representations of the one or more portions of the structure presented in the image data;

determine one or more dimensions of one or more portions of the structure based on the position data;

receive data comprising one or more assessments of damage corresponding to the scenario and the one or more dimensions; and generate a policy quote based in part on the one or more assessments.

19. The non-transitory computer-readable medium of claim 18, wherein the computer-executable instructions that, when executed by a processor, is configured to cause the processor to track the position data comprises receiving motion data from one or more motion sensors configured to capture additional data indicative of one or more gestures of the user.

20. The non-transitory computer-readable medium of claim 18, wherein the computer-executable instructions that, when executed by a processor, is configured to:

detect one or more gestures via the image data; and add data into one or more virtual forms based on the one or more gestures.

* * * * *